United States Patent [19]

Fergason

[11] Patent Number: 4,605,284
[45] Date of Patent: * Aug. 12, 1986

[54] ENCAPSULATED LIQUID CRYSTAL AND METHOD

[75] Inventor: James L. Fergason, Atherton, Calif.

[73] Assignee: Manchester R & D Partnership, Cleveland, Ohio

[*] Notice: The portion of the term of this patent subsequent to Mar. 6, 2001 has been disclaimed.

[21] Appl. No.: 626,425

[22] Filed: Jun. 29, 1984

Related U.S. Application Data

[60] Division of Ser. No. 477,242, Mar. 21, 1983, which is a continuation-in-part of Ser. No. 302,780, Sep. 15, 1981, Pat. No. 4,435,047.

[51] Int. Cl.⁴ .................................................. G02F 1/13
[52] U.S. Cl. .................................... 350/334; 350/344
[58] Field of Search .................... 350/334, 344, 351

[56] References Cited

U.S. PATENT DOCUMENTS

| | | | |
|---|---|---|---|
| 3,861,213 | 1/1975 | Parker | 350/351 X |
| 3,872,050 | 3/1975 | Benton et al. | 350/351 X |
| 4,048,358 | 9/1977 | Shanks | 350/351 X |
| 4,435,047 | 3/1984 | Fergason | 350/334 |

*Primary Examiner*—John K. Corbin
*Assistant Examiner*—Richard F. Gallivan
*Attorney, Agent, or Firm*—Renner, Otto, Boisselle & Lyon

[57] ABSTRACT

Briefly, according to one aspect of the invention, liquid crystal material, and especially nematic material, is encapsulated; according to another aspect the encapsulated liquid crystal material is used in liquid crystal devices, such as relatively large size visual display devices; and according to further aspects there are provided methods for encapsulating liquid crystal material and for making a liquid crystal device using such encapsulated liquid crystal material.

28 Claims, 7 Drawing Figures

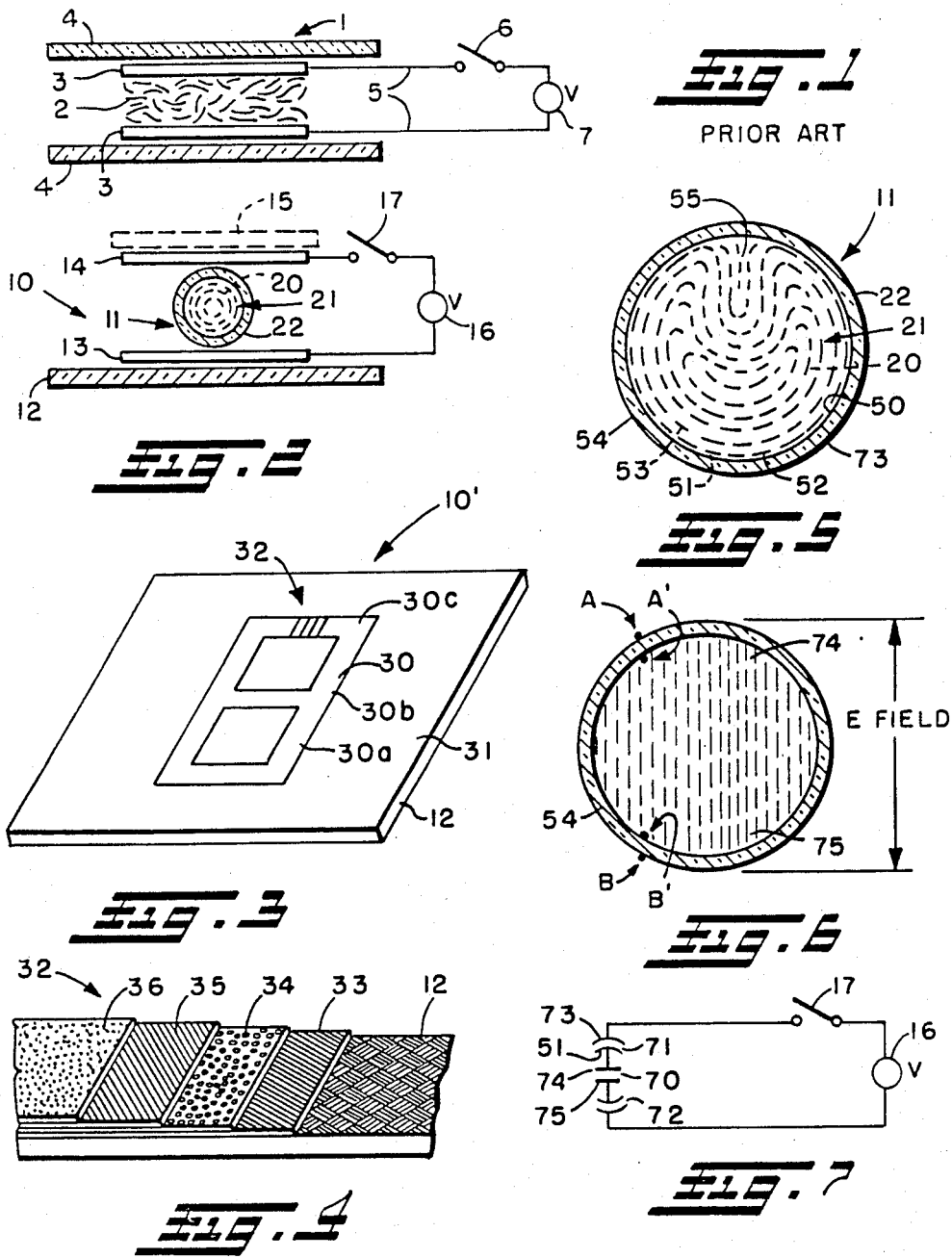

ENCAPSULATED LIQUID CRYSTAL AND METHOD

CROSS REFERENCE TO RELATED APPLICATION

This application is a division of Ser. No. 477,242, filed Mar. 21, 1983, which is a continuation-in-part of my copending, commonly assigned, U.S. patent application Ser. No. 302,780, filed Sept. 16, 1981, for "Encapsulated Liquid Crystal and Method", now U.S. Pat. No. 4,435,047, the entire disclosure of which is hereby incorporated by reference.

TECHNICAL FIELD

The present invention relates generally to liquid crystals and, more particularly, to encapsulated liquid crystals. Moreover, the invention relates to devices using such encapsulated liquid crystals and to methods of making such encapsulated liquid crystals and devices.

BACKGROUND

Liquid crystals currently are used in a wide variety of devices, including optical devices such as visual displays. Such devices usually require relatively low power and have a satisfactory response time, provide reasonable contrast, and are relatively economical. The property of liquid crystals enabling use, for example, in visual displays, is the ability of liquid crystals to transmit light on one hand, and to scatter and/or absorb light, on the other, depending on the alignment (or lack of alignment) of the liquid crystal structure with, e.g. an electric field applied across the liquid crystal material. An example of electrically responsive liquid crystal material and use thereof is provided in U.S. Pat. No. 3,322,485.

Certain liquid crystal material is responsive to temperature, changing optical characteristics in response to temperature of the liquid crystal material.

The invention of the present application is disclosed hereinafter particularly with reference to the use of liquid crystal material that is particularly responsive to an electric field.

Currently there are three categories of liquid crystal materials, namely cholesteric, nematic and smectic types. The invention of the present application relates in the preferred embodiment described below to use of liquid crystal material which is operationally nematic (as hereinafter defined). However, various principles of the invention may be employed with various one or ones of the other known types of liquid crystal material or combinations thereof. The various characteristics of the cholesteric, nematic and smectic types of liquid crystal material are described in the prior art. One known characteristic of liquid crystal material is that of reversibility; in particular it is noted here that nematic liquid crystal material is known to be reversible, but cholesteric material is not reversible. One characteristic of a reversible material is that the liquid crystal structure will return to its original configuration after an electric field has been applied and then removed.

To enhance contrast and possibly other properties of liquid crystal material, pleochroic dyes have been mixed with the liquid crystal material to form a solution therewith. The molecules of the pleochroic dye generally align with the molecules of the liquid crystal material. Therefore, such pleochroic dyes will tend to function optically in a manner similar to that of the liquid crystal material in response to a changing parameter, such as application or non-application of an electric field. Examples of the use of pleochroic dyes with liquid crystal material are described in U.S. Pat. Nos. 3,499,702 and 3,551,026.

An important characteristic of liquid crystal material is anisotropy. An anisotropic material has different physical properties in different directions. For examples, liquid crystals are optically anisotropic i.e. they have indices of refraction which vary with the direction of propagation and polarization of the incident light.

Liquid crystal material also has electrical anisotropy. For example, the dielectric constant for nematic liquid crystal material may be one value when the olecules in the liquid crystal structure are parallel to the electric field and may have a different value when the molecules in the liquid crystal structure are aligned perpendicular to an electric field. Since such dielectric value is a function of alignment, for example, reference to the same as a "dielectric coefficient" may be more apt than the usual "dielectric constant" label. Similar properties are true for other types of liquid crystals.

Some brief discussion of the encapsulation of cholesteric liquid crystal material is presented in U.S. Pat. Nos. 3,720,623, 3,341,466, and 2,800,457, the latter two patents being referred to in the first named patent.

In the past, device using liquid crystals, such as visual display devices or other devices, have been of relatively small size. Large size devices using liquid crystals, such as, for example, a billboard display or a sign have not been satisfactory fabricatable for a number of reasons. One reason is the fluidity of the liquid crystals, (the liquid crystal material may tend to flow creating areas of the display that have different thicknesses). As a result, the optical characteristics of the display may lack uniformity, have varying contrast characteristics at different portions of the display, etc; the thickness variations in turn cause variations or gradations in optical properties of the liquid crystal device. Moreover, the varying thickness of the liquid crystal layer will cause corresponding variations in the electrical properties of the liquid crystal layer, such as capacitance and impendance, further reducing uniformity of a large size liquid crystal device. The varying electrical properties of the liquid crystal layer, than, also may cause a corresponding variation in the effective electric field applied across the liquid crystal material and/or in response to a constant electric field would respond differently at areas of the liquid crystal that are of different thicknesses.

A pleochroic display, i.e. one in which pleochroic dye and liquid crystal material are in solution together, has the advantage of not requiring the use of a polarizer. However, such a pleochroic device has a disadvantage of relatively low contrast when only nematic liquid crystal material is used. It was discovered in the past, though, that a cholesteric liquid crystal material could be added to the nematic one together with the dye to improve the contrast ratio. See White et al article, *"Journal of Applied Physics"*, Volume 45, No. 11, November 1974, at pages 4718–4723, for example. The cholesteric material would tend not to return to its original zero field form when the electric field is removed.

Another problem encountered with pleochroic dye included in solution with liquid crystal material, regardless of the particular type of liquid crystal material, is that the light absorption of the dye is not zero in the "field-on" condition; rather such absorption in the "field-on" condition follows a so-called ordering parameter, which relates to or is a function of the relative alignment of the dyes. The optical transmission characteristic of liquid crystal material is an exponential function of the thickness of the liquid crystal material; specifically, the "on" state or "field-on" or "energized" state of the liquid crystal material is an exponential function of the thickness of the liquid crystal material, and the "absorbing" state or "off" state also is a different exponential function of the thickness.

To overcome those problems described in the two immediately preceding paragraphs, the liquid crystal material should have an optimum uniform thickness. (As used herein the term "liquid crystal" material means the liquid crystals themselves and, depending on context, the pleochroic dye in solution therewith). There also should be an optimum spacing of the electrodes by which the electric field is applied to the liquid crystal material. To maintain such optimum thickness and spacing, rather close tolerances must be maintained. To maintain close tolerances, there is a limit as to the size of the device using such liquid crystals, for it is quite difficult to maintain close tolerances over large surface areas, for example.

BRIEF SUMMARY OF THE INVENTION

Briefly, according to one aspect of the invention, liquid crystal material is encapsulated; according to another aspect the encapsulated liquid crystal material is used in liquid crystal devices, such as relatively large size visual display devices and optical shutters; and according to further aspects there are provided methods for encapsulating liquid crystal material and for making a liquid crystal device using such encapsulated liquid crystal material.

Some terms used herein generally are defined as follows: "liquid crystal material" broadly refers to any type of liquid crystal material that will work in the context of the present invention, but preferably refers to operationally nematic liquid crystal material. By "operationally nematic" is meant that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, chiral ingredients which induce a tendency to twist but cannot overcome the effects of boundary alignment would still be considered operationally nematic. Such operationally nematic liquid crystal material may include pleochroic dyes, chiral compounds, or other co-ingredients. A capsule refers to a containment device or medium that confines a quantity of liquid crystal material, and "encapsulating medium" or "material" is that medium or material of which such capsules are formed. An "encapsulated liquid crystal" or "encapsulated liquid crystal material" means a quantity of liquid crystal material confined or contained in discrete volumes within the encapsulating medium, for example in a solid medium as individual capsules or dried stable emulsions.

Capsules according to this invention generally have an approximately spherical configuration (though this is not, per se, a requisite of the invention) having a diameter from about 0.3 to 100 microns, preferably 0.1 to 30 microns, especially 3 to 15 microns, for example 5 to 15 microns. In the context of this invention, encapsulation and like terms refer not only to the formation of such articles as are generally referred to as capsules, but also to the formation of stable emulsions or dispersions of the liquid crystal material in an agent (an encapsulating medium) which results in the formation of stable, preferably approximately uniformly sized, particles in a uniform surrounding medium. Techniques for encapsulation, generally referred to as microencapsulation because of the capsule size, as well known in the art (see, e.g., "Microcapsule Processing and Technology" by Asaji Kondo, published by Marcel Dekker, Inc.) and it will be possible for one skilled in the art, having regard to the disclosure herein, to determine suitable encapsulating agents and methods for liquid crystal materials.

A liquid crystal device is a device formed of liquid crystal material. In the present invention such devices are formed of encapsulated liquid crystals capable of providing a function of the type typically inuring to liquid crystal material; for example, such a liquid crystal device may be a visual display or an optical shutter that in response to application and removal of an electric field effects a selected attenuation of optical radiation, preferably including from far infrared through ultraviolet wavelengths.

One method of making encapsulated liquid crystals includes mixing together liquid crystal material and an encapsulating medium in which the liquid crystal material will not dissolve and permitting formation of discrete capsules containing the liquid crystal material.

A method of making a liquid crystal device including such encapsulated liquid crystal includes, for example applying such encapsulated liquid crystal material to a substrate. Moreover, such method may include providing means for applying an electric field to the liquid crystal material to affect a property thereof.

According to another feature of the invention an operationally nematic material in which is dissolved a pleochroic dye is placed in a generally spherical capsule. In the absence of an electric field, the capsule wall distorts the liquid crystal structure so it and the dye will tend to absorb light regardless of its polarization direction. When a suitable electric field is applied across such a capsule, for example across an axis thereof, the liquid crystal material will tend to align parallel to such field causing the absorption characteristic of such material to be reduced to one assumed when the liquid crystal material is in the planar configuration. To help assure that adequate electric field is applied across the liquid crystal material in the capsule, and not just across or through the encapsulating medium, and, in fact, with a minimum voltage drop across the wall thickness of the respective capsules, the encapsulating material preferably has a dielectric constant no less than the lower dielectric constant of the liquid crystal material, on the one hand, and a relatively large impedance, on the other hand. Ideally, the dielectric constant of the encapsulating medium should be close to the higher dielectric constant of the liquid crystal.

Contrast of a liquid crystal device employing encapsulated liquid crystals may be improved by selecting an encapsulating medium that has an index of refraction that is matched to the ordinary index of refraction of the liquid crystal material (i.e. the index of refraction parallel to the optical axis of the crystal. See, e.g. "Optics" by Born & Wolf, or "Crystals and the Polarizing Microscope" by Hartshorne & Stewart. The encapsulating medium may be used not only to encapsulate liquid crystal material but also to adhere the capsules to a substrate for support thereon. Alternatively, a further binding medium may be used to hold the liquid crystal capsules relative to a substrate. In the latter case, though, preferrably the additional binding medium has an index of refraction which is matched to that of the encapsulating medium for maintaining the improved contrast characteristic described above. Because the index of refraction of a material is generally strain-dependent, and strain may be induced in, e.g. the encapsulating medium, it may be necessary to consider this effect in matching the indices of refraction of the liquid crystal, encapsulating medium, and binding medium, if present. Further, if iridescence is to be avoided, it may be desirable to match the indices of refraction over a range of wavelengths to the extent possible, rather than at just one wavelength.

A feature of the spherical or otherwise curvilinear surfaced capsule which confines the liquid crystal material therein in accordance with the present invention is that the liquid crystal material tends to follow the curvature or otherwise to align itself generally parallel with the curved surfaces of such capsule. Accordingly, the liquid crystal structure tends to be forced or distorted to a specific form, being folded back on itself in a sense as it follows the capsule wall, so that the resulting optical characteristic of a given capsule containing liquid crystal material is such that substantially all light delivered thereto will be affected, for example, scattered (when no pleochroic dye is present) or absorbed (when pleochroic dye is present), when no electric field is applied, regardless of the polarization direction of the incident light. Even without dye this effect can cause scattering and thus opacity.

Another feature is the ability to control the effective thickness of the liquid crystal material contained in a capsule by controlling the internal diameter of such capsule. Such diameter control may be effected by a size fractionation separation process during the making of the encapsulated liquid crystals using any one of a variety of conventional or novel sorting techniques as well as by controlling the mixing process, the quantities of ingredients, and/or the nature of the ingredients providing during mixing. By controlling such thickness parameter to relatively close tolerances, then, the subsequent tolerance requirements when the final liquid crystal device is made using the encapsulated liquid crystals will not be as critical as was required in the past for non-encapsulated devices.

Moreover, a further and very significant feature of the present invention is that there appears to be no limitation on the size of a high quality liquid crystal device that can be made using the encapsulated liquid crystals in accordance with the present invention. More specifically, by providing for confinement of discrete quantities of liquid crystal material, for example, in the described capsules, the various problems encountered in the past that prevented the use of liquid crystal material in large size devices are overcome, for each individual capsule in effect can still operate as an independent liquid crystal device. Moreover, each capsule preferably has physical properties enabling it to be mounted in virtually any environment including one containing a plurality of further such liquid crystal capsules mounted to a substrate or otherwise supported for use in response to application and removal of some type of excitation source, such as, for example, an electric or magnetic field. This feature also enables placement of the liquid crystal material on only selected areas of the optical device, such as in large size displays (e.g. billboards), optical shutters, etc.

Important considerations in accordance with the invention, and the discovery of the inventor, are that an encapsulating medium having electrical properties matched in a prescribed way to the electrical properties of liquid crystal material encapsulated thereby and additionally preferably optically matched to optical properties of such liquid crystal material permits efficient and high quality functioning of the liquid crystal material in response to excitation or non-excitation by an external source; and that the interaction of the encapsulating medium with the liquid crystal material distorts the latter in a prescribed manner changing an operational mode of liquid crystal material. Regarding the latter, by forcing the liquid crystal structure to distort into generally parallel or conforming alignment with the capsule wall, the liquid crystals will absorb or block, rather than transmit, light when not subject to an electric field and will be functional with respect to all manners of incident light regardless of the direction of polarization, if any, of such incident light.

With the foregoing in mind, a primary object of the invention is to enable the use of liquid crystal material over relatively large surfaces, and especially to effect the same while maintaining relatively high quality of operation, controlled uniformity of output and satisfactory contrast, which is achieved by the encapsulation of that material.

Another primary object is to confine liquid crystal material while maintaining the optical characteristics of such material, and especially to effect the same while also maintaining electrical responsiveness of the liquid crystal material.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be suitably employed.

BRIEF DESCRIPTION OF THE DRAWING

In the annexed drawing:

FIG. 1 is a schematic representation of a prior art liquid crystal device;

FIG. 2 is a schematic representation of a liquid crystal device in accordance with the present invention;

FIG. 3 is an isometric view of a liquid crystal display device in accordance with the present invention;

FIG. 4 is an enlarged fragmentary view, partly broken away, of a portion of the liquid crystal display device of FIG. 3;

FIG. 5 is an enlarged schematic illustration of a liquid crystal capsule in accordance with the present invention under a no field condition;

FIG. 6 is a view similar to FIG. 5 under an applied electric field condition; and FIG. 7 is a schematic electric circuit diagram representation of the capsule with an applied field.

SUMMARY OF A PRIOR ART LIQUID CRYSTAL DEVICE

Referring now in detail to the drawing, wherein like reference numerals designate like parts in the several figures, and initially to FIG. 1, a prior art liquid crystal device is generally indicated at 1. Such device 1 includes liquid crystal material 2 sandwiched between electrodes 3 of, for example, indium tin oxide that are deposited for support on respective mounting or confining substrates 4, such as glass, plastic sheets or the like. The sheets 4 may be clear as may be the electrodes 3 so that the device 1 is an optical transmission control device, whereby incident light may be absorbed and/or scattered when no electric field is applied by the electrodes 3 across a liquid crystal material 2 and the incident light may be transmitted through the liquid crystal material 2 when an electric field is applied thereacross. Electric leads 5 and switch 6 selectively couple voltage source 7 across the electrodes 3 to provide such electric field. The voltage source 7 may be either an AC or a DC voltage source.

The liquid crystal material 2 in the device 1 is somewhat confined by the substrates 4 for retention in a desired location, say for example, to be used overall as part of a digital display device. On the other hand, the liquid crystal material 2 must have adequate freedom of movement so that it may assume either a random orientation or distribution when no electric field is applied or a prescribed distributional or orientational alignment when an electric field is applied across the electrodes 3. If desired, one of the substrates 4 may be reflective to reflect incident light received through the liquid crystal material 2 back through the latter for delivery through the other substrate 4 for subsequent use. The various principles of operation and features and disadvantages of the liquid crystal device 1 are summarized above and are described in the prior art literature.

The liquid crystal material 2 may be of virtually any type that is responsive to an electric field applied thereacross so as to have a desired operating characteristic intended for the device 1; the liquid crystal material 2 also may include, if desired, pleochroic dye material in solution therewith.

DESCRIPTION OF THE PREFERRED EMBODIMENT

Turning now to FIG. 2, an improved liquid crystal device in accordance with the present invention is indicated at 10. The device 10 includes an encapsulated liquid crystal 11 which is supported by a mounting substrate 12 across which an electric field may be applied via electrodes 13, 14.

The electrode of 13 may be, for example, a quantity of vacuum deposited indium tin oxide to the substrate 12, and the electrode 14 may be, for example, electrically conductive ink. A protective layer or coating 15 may be applied over the electrode 14 for protective purposes but such layer 15 ordinarily would not be necessary for supporting or confining the encapsulated liquid crystal 11 or the electrode 14. Voltage may be applied to the electrodes 13, 14 from an AC or DC voltage source 16, selectively closable switch 17, and electrical leads 18, 19 in turn to apply an electric field across the encapsulated liquid crystal 11 when the switch 17 is closed.

The encapsulated liquid crystal 11 includes liquid crystal material 20 contained within the confines or interior volume 21 of a capsule 22. According to the preferred embodiment and the best mode of the present invention, the capsule 22 is generally spherical. However, the principles of the invention would apply when the capsule 22 is of a shape other than spherical. Such shape should provide the desired optical and electrical characteristics that will satisfactorily coexist with the optical characteristics of the liquid crystal 20, e.g. index of refraction, and will permit an adequate portion of the electric field to occur across the liquid crystal material 20 itself for effecting desired alignment of the liquid crystal structure when it is desired to have a field on condition. A particular advantage to the preferred spherical configuration of the capsule 22 will be described below with respect to the distortion it effects on the liquid crystal structure.

The mounting substrate 12 and the electrodes 13, 14 as well as the protective coating 15 may be optically transmissive so that the liquid crystal device 10 is capable of controlling transmission of light therethrough in response to whether or not an electric field is applied across the electrodes 13, 14 and, thus, across the encapsulated liquid crystal 11. Alternatively, the mounting substrate 12 may be optically reflective or may have thereon an optically reflective coating so that reflection by such reflective coating of incident light received through the protective coating 15 will be a function of whether or not there is an electric field applied across the encapsulated liquid crystal 11.

According to the preferred embodiment and best mode of the invention a plurality of encapsulated liquid crystals 11 would be applied to the mounting substrate 12 in a manner such that the encapsulated liquid crystals adhere to the mounting substrate 12 or to an interface material, such as the electrode 13, for support by the mounting substrate 12 and retention in a fixed position relative to the other encapsulated liquid crystals 11. Most preferably the encapsulating medium of which the capsule 22 is formed is also suitable for binding or otherwise adhering the capsule 22 to the substrate 12. Alternatively, a further binding medium (not shown) may be used to adhere the encapsulated liquid crystals 11 to the substrate 12. Since the capsules 22 are adhered to the substrate 12, and since each capsule 22 provides the needed confinement for the liquid crystal material 20, a second mounting substrate, such as the additional one shown in the prior art liquid crystal device 1 of FIG. 1, ordinarily would be unnecessary. However, for the purpose of providing protection from scarring, electrochemical deterioration, e.g. oxidation, or the like, of the electrode 14, a protective coating 15 may be provided on the side or surface of the liquid crystal device 10 opposite the mounting substrate 12, the latter providing the desired physical protection on its own side of the device 10.

Since the encapsulated liquid crystals 11 are relatively securely adhered to the substrate 12 and since there ordinarily would be no need for an additional substrate, as mentioned above, the electrode 14 may be applied directly to the encapsulated liquid crystals 21.

Turning now to FIG. 3, an example of a liquid crystal device 10' in accordance with the invention is shown in the form of a liquid crystal display device, which appears as a square cornered figure eight 30 on the substrate 12, which in this case preferably is of a plastic material, such as Mylar, or may alternatively be another material, such as glass, for example. The shaded area appearing in FIG. 3 to form the square cornered figure eight is formed of plural encapsulated liquid crystals 11 arranged in one or more layers on and adhered to the substrate 12.

An enlarged fragmentary section view of a portion 32 of the figure eight 30 and substrate 12 is illustrated in FIG. 4. As is seen in FIG. 4, on the surface 31 of the substrate 12, which may be approximately 10 mils thick, is deposited a 200 angstrom thick electrode layer 33 of, for example, indium tin oxide or other suitable electrode material such as gold, aluminum, tin oxide, antimony tin oxide, etc. One or more layers 34 of plural encapsulated liquid crystals 11 are applied and adhered directly to the electrode layer 33. Such adherence according to the preferred embodiment and best mode is effected by the encapsulating medium that forms respective capsules 22, although, if desired, as was mentioned above, an additional adhering or binding material may be used for such adherence purposes. The thickness of the layer 34 may be, for example, approximately 0.3 to 10 mils, preferably 0.7 to 4 mils, more preferably 0.8 to 1.2 mils, especially 1 mil. Other thicknesses may also be used, depending inter alia on the ability to form a thin film and the electrical breakdown properties of the film. A further electrode layer 35 is deposited on the layer 34 either directly to the material of which the capsules 22 are formed or, alternatively, to the additional binding material used to bind the individual encapsulated liquid crystals 11 to each other and to the mounting substrate 12. The electrode layer 35 may be, for example, approximately ½ mil thick and may be formed, for example, of electrically conductive ink or of the materials mentioned above for layer 33. A protective coating layer 36 for the purposes described above with respect to the coating 15 in FIG. 3 also may be provided as is shown in FIG. 4.

In a conventional visual display device either of the liquid crystal or light emitting diode type, the figure eight element 30 ordinarily would be divided into seven electrically isolated segments, each of which may be selectively energized or not so as to create various numeral characters. For example, energization of the segments 30a and 30b would display the numeral "1", and energization of the segments 30a, 30b, and 30c would display the numeral "7".

A feature of the present invention utilizing the encapsulated liquid crystals 11 is that a versatile substrate 12 can be created to be capable of displaying virtually any desired display as a function of only the selective segments of conductive ink electrodes printed on the liquid crystal material. In this case, the entire surface 31 of the substrate 12 may be coated with electrode material 33, and even the entire surface of that electrode material may be coated substantially contiguously with layer 34 of encapsulated liquid crystals 11. Thereafter, a prescribed pattern of electrode segments of conductive ink 35 may be printed where desired on the layer 34. A single electrical lead may attach the surface 31 to a voltage source, and respective electrical leads may couple the respective conductive ink segments via respective controlled switches to such voltage source. Alternatively, the encapsulated liquid crystals 11 and/or the electrode material 33 may be applied to the surface 31 only at those areas where display segments are desired. The ability to apply encapsulated liquid crystal to only a desired area or plurality of areas such as the segments of a display by essentially conventional processes (such as e.g. silk-screening or other printing processes) is particularly attractive, when compared with the prior art, which has the problem of containing liquid crystals between flat plates.

Although a detailed description of the operation of the individual encapsulated liquid crystals 11 will be presented below, it will suffice here to note that the encapsulated liquid crystals in the layer 34 function to attenuate or not to attenuate light incident thereon in dependence on whether or not an electric field is applied thereacross. Preferably a pleochroic dye is present in solution in the liquid crystal material to provide substantial attenuation by absorption in the "field-off" condition but to be substantially transparent in the "field-on" condition. Such an electric field may be, for example, one produced as a result of the coupling of the electrode layer portions 33, 35 at an individual segment, such as segment 30a, of the liquid crystal device 10' to an electrical voltage source. The magnitude of the electric field required to switch the encapsulated liquid crystals 11 from a no field (deenergized) condition to a field-on (energized) condition may be a function of several parameters, including, for example, the diameter of the individual capsules and the thickness of the layer 34, which in turn may depend on the diameter of individual capsules 22 and the number of such capsules in the thickness direction of layer 34. Importantly, it will be appreciated that since the liquid crystal material 20 is confined in respective capsules 22 and since the individual encapsulated liquid crystals 11 are secured to the substrate 12, the size of the liquid crystal device 10' or any other liquid crystal device employing encapsulated liquid crystals in accordance with the present invention is virtually unlimited. Of course, at those areas where it is intended to effect a change in the optical properties of the encapsulated liquid crystals of such a device in response to a no field or field on condition, it would be necessary to have at such areas electrodes or other means for applying to such liquid crystals a suitable electric field.

The electrode layer 33 may be applied to the substrate 12 by evaporation, by vacuum deposition, by sputtering, by printing or by another conventional technique. Moreover, the layer 34 of encapsulated liquid crystals 11 may be applied, for example, by a web or gravure roller or by reverse roller printing techniques. The electrode layer 35 also may be applied by various printing, stenciling or other techniques. If desired, the electrode layer 33 may be prepared as a full coating of the substrate 12, such as Mylar, as described above, as part of the process in which the Mylar sheet material is manufactured, and the layer 34 also may be applied as part of such manufacturing process.

The ability to make and to use successfully liquid crystal devices of the type just described using encapsulated liquid crystals is due to the ability to make encapsulated liquid crystals and to the properties of such encapsulated liquid crystals, both of which are features of the present invention. These features now will be described with reference to FIGS. 5, 6 and 7 in particular.

Referring specifically to FIG. 5, the capsule 22 has a generally smooth curved interior wall surface 50 defining the boundary of the volume 21. The actual dimensional parameters of the wall surface 50 and of the overall capsule 22 are related to the quantity of liquid crystal material 20 contained therein. Additionally, the capsule 22 applies a force to the liquid crystals 20 tending to pressurize or at least to maintain substantially constant the pressure within the volume 21. As a result of the foregoing, and due to the surface wetting nature of the liquid crystal, the structure which ordinarily in free form would tend to be straight, although perhaps randomly distributed, is distorted to curve in a direction that generally is parallel to a relatively proximate portion of the interior wall surface 50. Due to such distortion the liquid crystals store elastic energy. For simplicity of illustration, and for facility of comprehending the foregoing concept, a layer 51 of liquid crystal molecules whose directional orientation is represented by respective dashed lines 52 is shown in closest dproximity to the interior wall surface 50. The directional orientation of the molecules 52 is distorted to curve in the direction that is parallel to a proximate area of the wall surface 50. The directional pattern of the liquid crystal molecules away from the boundary layer 52 within the capsule is represented by dashed lines 53. The liquid crystal molecules are directionally represented in such layers, but it will be appreciated that the liquid crystal molecules themselves are not confined to such layers. Thus, the organization in an individual capsule is determined by the organization of the structure 52 at the wall and is fixed unless acted on by outside forces, e.g. an electric field. On removal of the field, the directional orientation would revert back to the original orientation such as that shown in FIG. 5.

In the preferred embodiment and best mode of the present invention the liquid crystal molecules 52 are of the nematic type. Such molecules usually assume a parallel configuration, and a liquid crystal material comprised of such nematic molecules usually is optical polarization direction sensitive. However, since the structure 52 in the encapsulated liquid crystal 11 is distorted or forced to assume a curved form in the full three dimensions of the capsule 22, such nematic liquid crystal material in such capsule takes on an improved characteristic of being insensitive to the direction of optical polarization of light incident thereon. The inventor has discovered, moreover, that when the liquid crystal material 20 in the capsule 22 has pleochroic dye dissolved therein, such dye, which ordinarily also would be expected to have optical polarization sensitivity, no longer is polarization sensitive because the dye tends to follow the same kind of curvature orientation or distortion as that of the liquid crystal structure.

It is noted here that the liquid crystal material 20 in the capsule 22 has a discontinuity 55 in the generally spherical orientation thereof. Such discontinuity is caused by the inability of the liquid crystal to align uniformly in a manner compatible with parallel alignment with the wall 54 and a requirement for minimum elastic energy. The liquid crystal will, however, tend to follow around the discontinuity in the manner shown in planar form in FIG. 5, but in reality in three dimensions, following a pattern along the three dimensional generally spherical internal boundary wall surface 50 of the protruding discontinuity 55. Such discontinuity further distorts the liquid crystal structure which in turn further decreases the possibility that the liquid crystal material 20 would be sensitive to the optical polarization of the incident light.

With the liquid crystal structure being distorted to fold in on itself generally in the manner illustrated in FIG. 5, the encapsulated liquid crystal 11 ordinarily will absorb or block light from being transmitted therethrough when no electric field is applied across the encapsulated liquid crystal 11 and particularly across the liquid crystal material 20 thereof.

Although the foregoing discussion has been in terms of a homogeueous orientation of the liquid crystal material (parallel to the capsule wall), such is not a requisite of the invention. All that is required is that the interaction between the wall and the liquid crystal produce an orientation in the liquid crystal near that wall that is generally uniform and piecewise continuous, so that the spatial average orientation of the liquid crystal material over the capsule volume is strongly curved and there is no substantial parallel directional orientation of the liquid crystal in the absence of an electric field. It is this strongly curved orientation that results in the absorption/scattering and polarization insensitivity in the field off condition, which is a feature of this invention.

However, when an electric field is applied across the encapsulated liquid crystal 11 in the manner illustrated in FIG. 6, the liquid crystal and any pleochroic dye in solution therewith will align in response to the electric field in the manner shown in such figure. Such alignment permits light to be transmitted through the encapsulated liquid crystal 11, for example as described above with reference to FIGS. 2, 3 and 4.

In the field off condition, since the liquid crystal structure is distorted to a curved form, the structure has a certain elastic energy. Such elastic energy causes the crystals to function to do things that otherwise would not be possible when the liquid crystal structure assumes its ordinary linear form. For example, the discontinuity protrusion 55 tends to cause scattering and absorption within the capsule, and the tangential or parallel alignment of the liquid crystal molecules to respective portions of interior wall surface 50 both cause scattering and absorption within the capsule 22. On the other hand, when the electric field is applied in the manner illustrated in FIG. 6, not only does the liquid crystal align as shown, but also the discontinuity 55 tends to vanish, being dominated by the electric field. Accordingly, such discontinuity will have a minimum effect on optical transmission when the encapsulated liquid crystal 11 is in a field on condition.

To optimize the contrast characteristics of a liquid crystal device, such as that shown at 10' in FIG. 3, comprised of encapsulated liquid crystals 11, and more particularly, to avoid optical distortion, due to refraction of incident light passing from the encapsulating medium into the liquid crystal material and vice versa, of the encapsulated liquid crystal 11 of FIG. 6, the index of refraction of the encapsulating medium and that the ordinary index of refraction of the liquid crystal material should be matched so as to be as much as possible the same. The closeness of the index matching will be dependent on the desired degree of contrast and transparency in the device, but the ordinary index of refraction of the crystal and the index of the medium will preferably differ by no more than 0.03, more preferably 0.01, especially 0.001. The tolerated difference will depend on capsule size and intended use of the device. The text "Optics" by Sears, published by Addison-Wesley, contains a thorough discussion of birefringence relevant to the foregoing, and the relevant portions of such text are incorporated herein by reference.

However, when no field is applied there will be a difference in indices of refraction at the boundary of the liquid crystal and capsule wall due to the extraordinary index of refraction of the liquid crystal being greater than the encapsulating medium. This causes refraction at that interface or boundary and thus further scattering and is a reason why encapsulated nematic liquid crystal material in accordance with the present invention, in particular, will function to prevent transmission of light even without the use of pleochroic dye.

Ordinarily the encapsulated liquid crystals 11 would by applied to the substrate 12 (FIG. 3) such that the individual encapsulated liquid crystals 11 are relatively randomly oriented and preferably several capsules thick to assure an adequate quantity of liquid crystal material on the surface 31 of the substrate to thereby provide the desired level of light blockage and/or transmission characteristics for, for example, a liquid crystal device 10' or the like.

In a liquid crystal device, such as that shown in 10' in FIG. 3, which is comprised of liquid crystal material 20 including pleochroic dye to form encapsulated liquid crystals 11 according to the invention, it has been discovered the the degree of optical absorbency is at least about the same as that of relatively free (unencapsulated) liquid crystal material, including pleochroic dye such as that shown in FIG. 1. It also has been discovered unexpectedly that when the electric field is applied in the manner illustrated in FIG. 6, for example, the clarity or lack of opaqueness of the encapsulated liquid crystal material 20 including pleochroic dye is at least about the same as that of the ordinary case in the prior art device 1 having dye in solution with relatively free liquid crystal material.

It is important that electrical field E shown in FIG. 6 is applied to the liquid crystal material 20 in the capsule 22 for the most part rather than being dissipated or dropped substantially in the encapsulating material of which the capsule itself is formed. In other words, it is important that there not be a substantial voltage drop across or through the material of which the wall 54 of the capsule 22 is formed; rather, the voltage drop should occur predominantly across the liquid crystal material 20 within the volume 21 of the capsule 22.

The electrical impedance of the encapsulating medium preferably should in effect be sufficiently larger than that of the liquid crystal material in the encapsulated liquid crystal 11 (FIG. 6) so that a short circuit will not occur exclusively through the wall 54, say from point A via only the wall to point B, bypassing the liquid crystal material. Therefore, for example, the effective impedance to induced or displacement current flow through or via the wall 54 from point A only via the wall 54 to point B, should be greater than the impedance that would be encountered in a path from point A to point A' inside the interior wall surface 50, through the liquid crystal material 20 to point B' still within the volume 21, thence ultimately to point B again. This condition will ensure that there will be a potential difference between point A and point B, which should be large enough to produce an electric field across the liquid crystal material that will tend to align it. It will be appreciated that due to geometrical considerations, namely the length through only the wall from point A to point B, for example, that such a condition can still be met even though the actual impedance of the wall material may be lower than that of the liquid crystal material contained therein.

The dielectric constants (coefficients) of the material of which the encapsulating medium is formed and of which the liquid crystal material is comprised and the effective capacitance values of the capsule wall 54, particularly in a radial direction, and of the liquid crystal material across which the electric field E is imposed should all be so related that the wall 54 of the capsule 22 does not substantially decrease the magnitude of the applied electric field E. Ideally the capacitance dielectric constants of the entire layer 34 (FIG. 4) of encapsulated liquid crystal material should be substantially the same in the field-on condition.

A schematic electric circuit diagram representing the circuit across which the electric field E of FIG. 6 is imposed as illustrated in FIG. 7. The electric field is derived from the voltage source 16 when the switch 17 is closed. A capacitor 70 represents the capacitance of the liquid crystal material 20 in the encapsulated liquid crystal 11 when such electric field is applied in the manner illustrated in FIG. 6. The capacitor 71 represents the capacitance of the wall 54 of the capsule 22 at an upper area (the direction conveniently referring to the drawing but having no other particular meaning) and is, accordingly, curved in a manner similar to that of the upper portion of the capsule 22 of FIGS. 5 and 6. The capacitor 72 similarly represents the capacitance of the lower portion of the capsule exposed to the electric field E. The magnitudes of capacitance for each capacitor 70–72 will be a function of the dielectric constant (coefficient) of the material of which the respective capacitors are formed and of the spacing of the effective plates thereof. It is desirable that the voltage drop occurring across the respective capacitors 71, 72 will be less than the voltage drop across the capacitor 70; the result, then, is application of a maximum portion of the electric field E across the liquid crystal material 20 in the encapsulated liquid crystal 11 for achieving optimized operation, i.e. alignment, of the liquid crystal molecules thereof with a minimum total energy requirement of the voltage source 16. However, it is possible that the voltage drop in one or both capacitors 71, 72 will exceed the voltage drop across capacitor 70; this is operationally acceptable as long as the drop across the capacitor 70 (liquid crystal material) is great enough to produce an electric field that tends to align the liquid crystal material to and/or toward the field-on condition of FIG. 6, for example.

In connection with capacitor 71, for example, the dielectric material is that of which the wall 54 is formed relatively near the upper portion of the capsule 22. The effective plates of such capacitor 71 are the exterior and interior wall surfaces 73, 51, and the same is true for the capacitor 72 at the lower portion of the capsule 22 relative to the illustration of FIG. 6, for example. By making the wall 54 as thin as possible, while still providing adequate strength for containment of the liquid crystal material 20 in the volume 21, the magnitudes of capacitors 71, 72 can be maximized, especially in comparison to the rather thick or lengthy distance between the upper portion 74 of the liqid crystal material 20 of the lower portion 75 thereof which approximately or equivalently form the plates of the same number of the capacitor 70.

The liquid crystal material 20 will have a dielectric constant value that is anisotropic. It is preferable that the dielectric constant (coefficient) of the wall 54 be no lower than the lower dielectric constant (coefficient) of the anisotropic liquid crystal material 20 to help meet the above conditions. Since a typical lower dielectric constant for liquid crystal material is about 6, this indicates that the dielectric constant of the encapsulating material is preferably at least about 6. Such value can vary widely depending on the liquid crystal material used, being, for example, as low as about 3.5 and as high as about 8 in the commonly used liquid crystals.

The encapsulated liquid crystal 11 has features such that since the liquid crystal structure is distorted and since the pleochroic dye similarly is distorted, absorbency of blockage of light transmission through the encapsulated liquid crystal will be highly effective when no electric field E is applied thereacross. On the other hand, due both to the efficient application of an electric field across the liquid crystal material 20 in the encapsulated liquid crystals 11 to align the liquid crystal molecules and the dye along therewith as well as the above described preferred index of refraction matchong, i.e. of the encapsulating medium and of the liquid crystal material, so that incident light will not be refracted or bent at the interface between the capsule wall 54 and the liquid crystal material 20 when an electric field is applied, the encapsulated liquid crystal 11 will have a good optically transmissive characteristic.

Since a plurality of encapsulated liquid crystals 11 ordinarily is required to construct a final liquid crystal device, such as the device 10' of FIG. 3, and since those encapsulated liquid crystals are ordinarily present in several layers, it is desirable for the liquid crystal material to have a relatively high dielectric anisotropy in order to reduce the voltage requirements for the electric field E. More specifically, the differential between the dielectric constant (coefficient) for the liquid crystal material 20 when no electric field is applied which constant (coefficient) should be rather small, and the dielectric constant (coefficient) for the liquid crystal material when it is aligned upon application of an electric field, which constant (coefficient) should be relatively large, should be as large as possible consistent with the dielectric of the encapsulating medium.

The capsules 22 may be of various sizes. The smaller the capsule size, though, the higher the requirements will be for the electric field to effect alignment of the liquid crystal molecules in the capsule. Also, when the capsule size is relatively small, more capsules are required per unit area of the layer 34, and, therefore, more electric voltage drop losses will occur in the encapsulating medium than for larger size capsules, the density per unit area of which would be smaller. According to a preferred embodiment and best mode of the present invention, a device made with the encapsulated liquid crystals 11, such as the liquid crystal device 10', should use capsules of uniform size so that the device 10' can be energized or deenergized in a relatively uniform and well controlled manner. In contrast, when the capsules are of a non-uniform size, then non-uniform energization of the respective capsules, i.e. alignment of the liquid crystal molecules of each, would occur upon application of the electric field. Ordinarily the capsules 22 should have a size on the order of from about 1 to about 30 microns in diameter.

As was noted above, the larger the capsule size, the smaller the electric field required to effect alignment of the liquid crystal molecules therein. However, the larger the sphere, the longer the response time. A person of ordinary skill in the art should have no difficulty, having regard to this disclosure, in determining a suitable or optimum capsule size for a given application.

Currently a preferred liquid crystal material is nematic material NM8250 sold by American Liquid Xtal Chemical Corp., Kent, Ohio, U.S.A. and the 40% material above. Other liquid crystal materials may be esters or mixtures thereof, biphenyls or mixtures thereof, and the like, such as E-7, E-11, E-63, ZLI-2344, and ZLI-2392, as supplied by E. Merck Chemicals, Darmstadt, West Germany.

The encapsulating medium forming capsules 22 should be of a type that is substantially completely unaffected by and does not react with or otherwise chemically affect the liquid crystal material. In particular, the liquid crystal material should not be soluble in the encapsulating medium or vice versa. The other characteristics described above concerning dielectric constants (coefficients) and indices of refraction with respect to the liquid crystal material and to the encapsulatng medium also constrain material selection. Moreover, when a pleochroic dye is employed, the encapsulating medium also should be unaffected by and should not affect the dye material. On the other hand, the dye should be soluble in the liquid crystal material and not subject to absorption by the encapsulating medium. Additionally, to achieve the desired relatively high impedance for the encapsulating medium, such medium should have a relatively high level of purity. Especially when the encapsulating medium is prepared as an aqueous dispersion or by ionic polymerization, etc., it is important that the level of ionic (conductive) impurities should be as low as possible.

Examples of pleochroic dyes that may suitably be used in the encapsulated liquid crystals 11 in accordance with the present invention are indophenol blue, Sudan black B, Sudan 3, and Sudan 2, and D-37, D-43 and D-85 by E. Merck identified above.

Various resins and/or polymers may be used as the encapsulating medium.

Several types of liquid crystal material useful according to the invention include the following four recipes:

| 10% Material | |
|---|---|
| Pentylphenylmethoxy Benzoate | 54 grams |
| Pentylphenylpentyloxy Benzoate | 36 grams |
| Cyanophenylpentyl Benzoate | 2.6 grams |
| Cyanophenylpentyl Benzoate | 3.9 grams |
| Cyanophenylpentyloxy Benzoate | 1.2 grams |
| Cyanophenylheptyloxy Benzoate | 1.1 grams |
| Cyanophenyloctyloxy Benzoate | 0.94 grams |
| Cyanophenylmethoxy Benzoate | 0.35 grams |
| 20% Material | |
| Pentylphenylmethoxy Benzoate | 48 grams |
| Pentylphenylpentyloxy Benzoate | 32 grams |
| Cyanophenylpentyl Benzoate | 5.17 grams |
| Cyanophenylheptyl Benzoaté | 7.75 grams |
| Cyanophenylpentyloxy Benzoate | 2.35 grams |
| Cyanophenylheptyloxy Benzoate | 2.12 grams |
| Cyanophenyloctyloxy Benzoate | 1.88 grams |
| Cyanophenylmethoxy Benzoate | 0.705 grams |
| 40% Material | |
| Pentylphenylmethoxy Benzoate | 36 grams |
| Pentylphenylpentyloxy Benzoate | 24 grams |
| Cyanophenylpentyl Benzoate | 10.35 grams |
| cyanophenylheptyl Benzoate | 15.52 grams |
| Cyanophenylheptyloxy Benzoate | 4.7 grams |
| Cyanophenylheptyloxy Benzoate | 4.23 grams |
| Cyanophenylheptyloxy Benzoate | 3.76 grams |
| Cyanophenylmethoxy Benzoate | 1.41 grams |
| 40% MOD | |
| Pentylphenylmethoxy Benzoate | 36 grams |
| Pentylphenylpentyloxy Benzoate | 24 grams |
| Cyanophenylpentyl Benzoate | 16 grams |
| Cyanophenylheptyl Benzoate | 24 grams |

However, an encapsulating medium according to a preferred embodiment and best mode of the present invention when the encapsulation is performed by emulsification is polyvinyl alcohol (PVA), which has been found to have the desired properties mentioned above, especially in relation to the above described preferred liquid crystal and pleochroic dye material. Specifically, PVA has a good, relatively high, dielectric constant and has an index of refraction that is relatively closely matched to that of the preferred liquid crystal material.

To purify PVA, the same may be dissolved in water and washed out with alcohol using a precipitation technique. Other techniques also may be used for purifying PVA so that it will have minimum salt or other content that would reduce appreciably the electrical impedance thereof. The preferred purified PVA is Gelvatol sold by Mansanto. If PVA is properly purified, as aforesaid, it will serve well as its own emulsifier and as a wetting agent for facilitating the manufacture of encapsulated liquid crystals according to this method which will be described below. Other types of encapsulating medium may be, for example, gelatin; Carbopole; (a carboxy polymethylene polymer of B. F. Goodrich Chemical Corporation) Gantrez; (polymethyl vinyl ether/maleic an hydride) of GAF Corporation, preferably reached with water to form the acid the latter two being polyelectrolytes; and these media may be used alone or in combination with other polymers, such as PVA.

Other examples and characteristics of several PVA materials are shown in Table I.

It is noted here briefly that the characteristic of the pleochroic dye that it must be soluble in the liquid crystal material and that it not be subject to absorption by the water phase or polymer phase assures that such pleochroic dye will not be absorbed by the PVA or other encapsulating medium or by the carrier medium, such as the water, used during the manufacturing process for the encapsulated liquid crystals 11.

EXAMPLE 1

A 0.45% Sudan black B pleochroic dye was dissolved in a liquid crystal which was composed of aromatic esters. Such combined material is commercially sold under the designation NM8250 by American Liquid Xtal Chemical Corp. of Kent, Ohio. Such material was mixed with a solution of 7% PVA, which had been purified to remove all salts. The solution also was made with ASTM-100 water. The resulting mixture was put into a colloid mill whose conegap setting was 4 mils, and the material was milled for four minutes to give a rather uniform particle suspension size. The result was a stable emulsion whose suspended particle size was approximately 3 microns. The emulsion was cast on a Mylar film which was precoated with a 200 ohm per square layer of indium tin oxide electrode purchased from Sierracin. A doctor blade was used to cast the

TABLE I

| CONTAINMENT MEDIUM (PVA) | VISCOSITY | % HYDROLYZED | MOLECULAR Wgt. | TEMPERATURE & % SOLUTIONS |
|---|---|---|---|---|
| 20-30 Gelvatol, by Monsanto Company | 4-6 CPS | 88.7-85.5 | 10,000 | 4% at 20° C. |
| 40-20 Gelvatol, by Monsanto Company | 2.4-3 CPS | 77-72.9 | 3,000 | 4% at 20° C. |
| 523 Air Products and Chemicals, Inc. | 21-25 | 87-89 | — | 4% at 20° C. |
| 72-60 Elvanol, by DuPont Company | 55-60 | 99-100 | — | 4% at 20° C. |
| 405 Poval, by Kurashiki | 2-4 CPS | 80-82 | — | 4% at 20° C. |

The wetting ability of the PVA with respect to the liquid crystal material in the respective capsules 22, facilitates the preferred parallel alignment especially at the interior wall surface 50 in the field off condition and changing to the aligned position of FIG. 6 when an electric field is applied.

An emulsion method for making encapsulated liquid crystals 11 may include mixing together the encapsulating medium, the liquid crystal material (including, if used, the pleochroic dye material), and perhaps a carrier medium, such as water. Mixing may occur in a variety of mixer devices, such as a blender, a colloid mill, which is most preferred, or the like. What occurs during such mixing is the formation of an emulsion of the ingredients, which subsequently can be dried eliminating the carrier medium, such as water, and satisfactorily curing the encapsulating medium, such as the PVA. Although the capsule 22 of each thusly made encapsulated liquid crystal 11 may not be a perfect sphere, each capsule will be substantially spherical in configuration because a sphere is the lowest free energy state of the individual droplets, globules or capsules of the emulsion, both when originally formed and after drying and/or curing has occurred.

emulsion material on the Mylar film on the electrode coated side.

A 7 mil lay-down of the emulsion material was placed on such electrode and was allowed to dry to a total thickness of 0.8 mil. A second layer of such emulsion subsequently was laid on the first with a resulting aggregate layer of liquid crystal droplets in a polyvinyl alcohol matrix having a thickness of 1.6 mil. Preferably the encapsulated liquid crystals may be laid down in a single layer one or plural capsules thick.

The thusly formed liquid crystal device, including the layer of Mylar, electrode, and encapsulated liquid crystals was then tested by applying an electric field, whereupon the material changed from black to nearly clear-transparent. The material exhibited a very wide viewing angle, i.e. the angle at which light was transmitted, and the contrast ratio was 7:1 at 50 volts of applied electric field. The switching speed was about two milliseconds on and about 4 milliseconds off.

EXAMPLE 2

900 grams of 7% high viscosity fully hydrolysed polymer (SA-72 of American Liquid Xtal Chemical Corp.), 100 grams of 8250 nematic liquid crystal material also of American Liquid Xtal Chemical Corp., 0.45 grams of C26510 Sudan Black B, and 0.15 grams of C26100 Sudan III (the latter two ingredients being pleochroic dyes), were used. The polymer was weighed out in a breaker. The liquid crystal was weighed out, was placed on a hot plate, and was heated slowly. The dye was weighed out on a balance and was added very slowly to the liquid crystal, being stirred until all the dye went into solution.

The liquid crystal and dye solution then was filtered through a standard Millipore filtering system using 8 ml. filter paper. The filtered liquid crystal and dye solution was stirred into the polymer using a Teflon rod. Such mixture was encapsulated by placing the same in a colloid mill that was operated at medium shear for five minutes. The emulsion film was then pulled on a conductive polyester sheet.

In operation of such example, upon the application of a 10 volt electric field, the liquid crystal structure began to align, and at 40 volts reached saturation and maximum optical transmissivity.

EXAMPLE 3

The procedure of Example 2 was carried out using the same ingredients and steps except that a 5% high voscosity fully hydrolysed polymer, such as SA-72, was substituted for the 7% polymer of Example 2. Operational results were the same as in Example 2.

EXAMPLE 4

The process of Example 2 was carried out to make an emulsion using 4 grams of 20% medium viscosity, partly hydrolysed polymer (such as 405 identified in Table I above), 2 grams of 8250 nematic liquid crystal material having 0.08% of D-37 magenta pleochroic dye (a propreitary pleochroic dye manufactured and/or sold by E. Merck of West Germany) in the solution with the liquid crystal.

A slide was taken using a Teflon rod, and upon inspection showed medium size capsules of about 3 to 4 microns in diameter. The material was filtered through a Millipore screen filter and another slide was taken; on inspection there was very little change in capsule size from the first-mentioned inspection.

The emulsion was pulled onto a conductive polyester support film as in Example 2 using a doctor blade set at a 5 mil gap. In operation, the encapsulated liquid crystal material began to align upon the application of an electric field of 10 volts and was at saturation or full on at from about 40 to 60 volts.

EXAMPLE 5

Using a glass rod cleaned and washed with deionized ASTM-100 water, 2 grams of 40% 8250 nematic liquid crystal material with 0.08% of D-37 pleochroic dye dissolved therein was stirred into 4 grams of 405 desalted 20% by weight medium hydrolysis medium viscosity polymer very carefully for approximately 15 minutes. The material was then placed through a Millipore screen filter approximately 4 microns in size. A slide was taken after the bubbles had dissipated.

Thereafter, a film was pulled at a gap 5 mil setting on Intrex electrically conductive electrode film material that was placed on a polyester support of Mylar material. In operation it was evident that the liquid crystal material began aligning upon application of a 5 volt electric field. Contrast was good and the liquid crystal material was at full on or saturation upon the application of a 40 volt electric field.

EXAMPLE 6

This example used 8 grams of D-85 pleochroic dye dissolved in E-63 biphenyl liquid crystal. Such material is sold premixed by British Drug House, which is a subsidiary of E. Merck of West Germany. The example also used 16 grams of 20% PVA medium viscosity medium hydrolysis polymer as the encapsulating medium. The liquid crystal and pleochroic dye solution was mixed carefully by hand into the polymer at a slow rate. The combined material was then screened at a low shear. A slide was taken and on observation showed approximately 3 micron size capsules. A film of such emulsion was pulled onto an electrically conductive polyester sheet, as above, using a gap 5 mil setting. The film was on or began having liquid crystal structure align with the electric field at approximately 6 volts and was at saturation or full on at 24 volts.

EXAMPLE 7

A mixture was formed of 8250 nematic liquid crystal with 0.08% D-37 pleochroic dye in solution therewith and a solution of 15% AN169 Gantrez in 85% water. The mixture was of 15% liquid crystal and 85% Gantrez as the containment medium. The mixture was homogenized at low shear to form an emulsion, which was applied to an electrode/support film as above; such support film was about 1.2 mils thick. After drying of the emulsion, the resulting liquid crystal emulsion responded to an electric field generally as above, substantially absorbing or at least not substantially transmitting light when in field-off condition, showing a threshold of about 7 volts to begin transmitting, and having a saturation level of substantially maximum transmission at about 45 volts.

In accordance with the present invention the quantities of ingredients for making the encapsulated liquid crystals 11, for example in the manner described above, may be, as follows:

The liquid crystal material—This material may be from about 5% to about 20% and preferably about 50% (and in some circumstances even greater depending on the nature of the encapsulating material) including the pleochroic dye, by 25% (when using Gelvatol as the encapsulating material) volume of the total solution delivered to the mixing apparatus, such as a colloid mill. The actual amount of liquid crystal material used should ordinarily exceed the volume quantity of encapsulating medium, e.g. PVA to optimize the capsule size.

The PVA—The quantity of PVA in the solution should be on the order of from about 5% to about 50%, and possibly even greater depending on the hydrolysis and molecular weight of the PVA, and preferably, as described above, about 22%, For example, if the PVA has too large a molecular weight, the resulting material will be like glass, especially if too much PVA is used in the solution. On the other hand, if the molecular weight is too low, use of too little PVA will result in too low a viscosity of the material, and the resulting emulsion will not hold up well, nor will the droplets of the emulsion solidify adequately to the desired spherical encapsulated liquid crystals.

Carrier medium—The remainder of the solution would be water or other, preferably volatile, carrier medium, as described above, with which the emulsion can be made and the material laid down appropriately on a substrate, electrode or the like.

It will be appreciated that since the uncured capsules or droplets of encapsulating medium and liquid crystal material are carried in a liquid, various conventional or other techniques may be employed to grade the capsules according to size so that the capsules can be re-formed if of an undesirable size by feeding again through the mixing apparatus, for example, and so that the finally used capsules will be of a desired uniformity for the reasons expressed above.

Although the encapsulation technique has been described in detail with reference to emulsification, since the fact that the encapsulant material and binder are the same makes facile the production of liquid crystal devices; the preparation of discrete capsules of the liquid crystal material may on occasion be advantageous, and the use of such discrete capsules (with a binder) is within the contemplated scope of this invention.

Although the presently preferred invention operates in response to application and removal of an electric field, operation also may be effected by application and removal of a magnetic field.

I claim:

1. Liquid crystal apparatus, comprising liquid crystal material, and containment means for inducing a generally non-parallel alignment of said liquid crystal material which in response to such alignment at least one of scatters and absorbs light and which in response to a prescribed input reduces the amount of such scattering or absorption, said liquid crystal material and containment means comprising a dispersion thereof.

2. Liquid crystal apparatus, comprising liquid crystal material, and containment means for inducing a generally non-parallel alignment of said liquid crystal material which in response to such alignment at least one of scatters and absorbs light and which in response to a prescribed input reduces the amount of such scattering or absorption, said containment means forming capsule-like volumes for containing said liquid crystal material, said volumes being of a diameter of from about 0.3 microns to about 100 microns.

3. The invention of claim 2, said volumes being of a diameter of from about 1 micron to about 30 microns.

4. The invention of claim 3, said volumes being of a diameter of from about 3 microns to about 15 microns.

5. The invention of claim 4, said volumes being of a diameter of from about 5 microns to about 15 microns.

6. The invention of claim 2, further comprising substrate means for supporting a layer of said liquid crystal material and containment means.

7. The invention of claim 6, said layer being from about 0.3 mil to about 10 mils thick.

8. The invention of claim 6, said layer comprising several layers of capsule-like volumes in thickness.

9. The invention of claim 2, further comprising substrate means for supporting a layer of said liquid crystal material and containment means, a first electrode positioned between said substrate means and said layer, and a second electrode positioned on the opposite side of said layer relative to said substrate means.

10. The invention of claim 9, said first electrode being positioned over substantially the entire surface of said substrate means where said layer is supported on the latter.

11. The invention of claim 10, said second electrode being positioned only over predetermined selected areas, less than the entire area, of said layer.

12. The invention of claim 9, said substrate means having a thickness of about 10 mils, said first electrode having a thickness of about 200 Angstroms, said second electrode having a thickness of about 0.5 mil, and said layer having a thickness of from about 0.3 mil to about 10 mils.

13. The invention of claim 2, said capsule-like volumes of liquid crystal being silk-screened for support on said substrate means.

14. The invention of claim 9, said capsule-like volumes of liquid crystal being silk-screened for support on said substrate means.

15. The invention of claim 2, further comprising pleochroic dye mixed with said liquid crystal material.

16. The invention of claim 2, wherein the invention is operative independent of polarization of light incident thereon.

17. The invention of claim 2, wherein said prescribed input is an AC electrical field or a DC electrical field.

18. Liquid crystal material and a medium for containing discrete quantities of such liquid crystal material, said material having positive dielectric anisotropy, and wherein the difference between the ordinary index of refraction of said liquid crystal material and the index of refraction of said medium being no greater than 0.03.

19. The invention of claim 18, wherein said difference in indices of refraction being no greater than 0.01.

20. The invention of claim 18, wherein the difference between said indices of refraction is no greater than 0.001.

21. The invention of claim 18, further comprising pleochroic dye mixed with said liquid crystal material.

22. The invention of claim 18, wherein the invention is operative independent of polarization of light incident thereon.

23. Liquid crystal material and a medium for containing discrete quantities of such liquid crystal material, said material having positive dielectric anisotropy, said medium having a dielectric constant that is no less than the lower dielectric constant value of said material and such lower dielectric constant being from about 3.5 to about 8.

24. The invention of claim 23, wherein said prescribed input is an AC electrical field or a DC electrical field.

25. A method of making encapsulated nematic liquid crystals, comprising mixing at least an encapsulating medium and a nematic liquid crystal material, and further comprising selecting such liquid crystal material and such encapsulating medium such that the liquid crystal material has a positive dielectric anisotropy and the dielectric constant of such encapsulating medium is at least as great as the lower dielectric constant of such liquid crystal material and such lower dielectric constant is from about 3.5 to about 8.

26. A method of making encapsulated nematic liquid crystals, comprising mixing at least an encapsulating medium and a nematic liquid crystal material, and further comprising selecting such liquid crystal material and such encapsulating medium such that the difference between the ordinary index of refraction of the liquid crystal material and the index of refraction of the encapsulating medium is not greater than about 0.03.

27. The invention of claim 26, wherein such difference is not greater than about 0.01.

28. The invention of claim 26, wherein such difference is not greater than about 0.001.

* * * * *